US010018182B2

(12) United States Patent
Farr (10) Patent No.: US 10,018,182 B2
(45) Date of Patent: Jul. 10, 2018

(54) TURBINE DRIVEN BY WIND OR MOTOR AND METHOD FOR GENERATING ELECTRICITY

(71) Applicant: Darryl Orne Farr, Ontario (CA)

(72) Inventor: Darryl Orne Farr, Ontario (CA)

(*) Notice: Subject to any disclaimer, the term of this patent is extended or adjusted under 35 U.S.C. 154(b) by 464 days.

(21) Appl. No.: 14/407,041

(22) PCT Filed: Jun. 12, 2013

(86) PCT No.: PCT/CA2013/000570
§ 371 (c)(1),
(2) Date: Dec. 10, 2014

(87) PCT Pub. No.: WO2013/185216
PCT Pub. Date: Dec. 19, 2013

(65) Prior Publication Data
US 2015/0108757 A1  Apr. 23, 2015

(30) Foreign Application Priority Data

Jun. 13, 2012 (CA) ...................... 2779898

(51) Int. Cl.
| | |
|---|---|
| *F03D 9/00* | (2016.01) |
| *F03D 9/25* | (2016.01) |
| *F03D 15/10* | (2016.01) |
| *H02K 7/18* | (2006.01) |
| *F03D 7/02* | (2006.01) |
| *F03D 9/11* | (2016.01) |
| *F03D 15/00* | (2016.01) |

(52) U.S. Cl.
CPC ............... *F03D 9/25* (2016.05); *F03D 7/028* (2013.01); *F03D 7/0248* (2013.01); *F03D 9/11* (2016.05); *F03D 15/00* (2016.05); *F03D 15/10* (2016.05); *H02K 7/183* (2013.01); *F05B 2260/4021* (2013.01); *F05B 2260/4022* (2013.01); *Y02E 10/725* (2013.01)

(58) Field of Classification Search
CPC ... F03D 9/25; F03D 15/00; F03D 9/11; F03D 1/025; F03D 7/0248; F03D 7/028; H02K 7/183
See application file for complete search history.

(56) References Cited

U.S. PATENT DOCUMENTS

| 7,964,978 B1 | 6/2011 | Weissmann | |
|---|---|---|---|
| 2005/0200135 A1* | 9/2005 | Shibata | ................. F03D 7/0236 290/55 |

(Continued)

*Primary Examiner* — Viet Nguyen
(74) *Attorney, Agent, or Firm* — John Alumit (57) ABSTRACT

A turbine for generating electrical power includes oppositely rotating wheels which can be driven primarily by wind for driving a plurality of electrical power generators, or by a motor which may be a diesel, solar, electrical, or alternative fuel motor. One or more of the generators can also function as motors for driving the wheels. A method for generating electrical power involves a pair of wheels which rotate oppositely on a central shaft and a plurality of generators driven by the rotation of the wheels for generating power. The rotation of the wheels can be adjusted to a desired speed having regard to the current velocity of the wind and by means of a motor which is connected to the wheels so as to impart rotation thereof.

27 Claims, 7 Drawing Sheets

(56) References Cited

U.S. PATENT DOCUMENTS

| | | | |
|---|---|---|---|
| 2007/0297902 A1* | 12/2007 | Jonsson | F03D 3/068 416/23 |
| 2009/0121484 A1* | 5/2009 | Newman | F03D 3/007 290/44 |
| 2009/0224555 A1 | 9/2009 | Zhencai | |
| 2010/0111697 A1* | 5/2010 | Wood | F01D 1/24 416/128 |
| 2010/0266412 A1* | 10/2010 | Barber | F03D 1/0666 416/147 |
| 2011/0215583 A1* | 9/2011 | Lee | F03D 9/00 290/55 |
| 2011/0215587 A1* | 9/2011 | Lee | F03D 9/00 290/55 |
| 2011/0215738 A1* | 9/2011 | Kamen | F03D 3/005 315/302 |

* cited by examiner

TURBINE DRIVEN BY WIND OR MOTOR AND METHOD FOR GENERATING ELECTRICITY

TECHNICAL FIELD

The present invention relates generally to a turbine for generating electricity, and more particularly the present invention relates to a wind and motor driven turbine including oppositely rotating wheels.

BACKGROUND OF THE INVENTION

Turbine systems are known in the art and used to convert energy from a fluid flow into useful work. The simplest turbine system has one moving part, a rotor assembly, which conventionally takes the form of a shaft or drum with blades attached thereto. In operation, the moving fluid typically acts on the blades so as to produce rotation of the rotor. Exemplary turbine systems include windmills, watermills, as well as gas and steam turbines.

It is generally accepted in the art that the kinetic energy of wind is a function of the wind velocity, mass and cross-sectional area traversed by the wind. For example, one goal in the design of a windmill is to ensure that the mill can continue to operate at low wind speeds. To date this has been accomplished by use of lighter materials as well as by improving the structure and operation of the blades, and the manner in which the blades react to the flow of the wind. It is conventionally known in the art to use one or more wheels in connection with a windmill. The wheels are generally capable of rotation and adapted to capture the wind. In one design, two wheels can be mounted co-axially and adapted for oppositely rotation. However, the prior art has, thus far, failed to fully address several known drawbacks.

For example, U.S. Pat. No. 4,061,926 to Peed dated Dec. 6, 1977 teaches an electric generating system in which oppositely rotating wind driven wheels are used, one to drive the rotor and one to drive the stator of an electric generator. The system comprises two wind driven turbines having radially extending vanes mounted coaxially one above the other on a tubular stationary post-like support. However, the conventional device appears to use an additional mechanical synchronizer which is interposed between the two wheel structures so as to ensure that the two wheels rotate at the same speed, in variable wind conditions. The additional synchronizer, thus, adds to the overall complexity of the system and does not fully address the problem of operating the turbine when the wind speed is low or very low.

U.S. Pat. No. 4,074,951 to Hudson dated Feb. 21, 1978 describes a wind power converter including, inter alia, a pair of rotatable turbines with elongated curved blades disposed within a rotatable housing on axially parallel shafts. The conventional device also includes means for synchronizing the rotation of the turbines, and further includes fluid pumping means which must be connected to the turbine shafts.

U.S. Pat. No. 5,855,470 to Holmes dated Jan. 5, 1999 describes a wind wheel having at least one planetary gear wheel affixed rigidly to a wind-wheel axle from which gear trains for each of a plurality of wind-wheel plates are rotated to maximum plate frontage in wind flow by gear belts intermediate the gear trains and axes of the plurality of wind-wheel plates. The wind wheel can be structured with either a horizontal axis or a vertical axis with appropriate structural modifications. Directional control can be provided by eccentric positioning of the wind-wheel axis in order for the wind-wheel plates to have a weather-vane effect.

U.S. Pat. No. 6,688,925 to Garcia dated Feb. 10, 2004 describes two supporting wheels mounted permanently on a main shaft. Between those two wheels are four blades, or sails, that will transfer the power of wind and running water to the main shaft to make it rotate.

U.S. Pat. No. 7,323,791 to Jonsson dated Jan. 29, 2008 describes a wind turbine with a plurality of moveable members configured to direct air flow onto a first half of the rotatable frame and to block air flow onto a second half of the rotatable frame to thereby cause the rotatable frame to rotate. The moveable members may be pivotable louvers that can be opened by being oriented in a direction parallel to the direction of the air flow.

International Publication No. WO/2011/115845 dated Sep. 22, 2011 describes a wind turbine including a plurality of coaxial, counter-rotating turbine assemblies. First and second shroud assemblies define a generally spherical volume containing the first and second turbine assemblies. The first and second shroud assemblies each include a shroud member that can selectively shield or expose portions of the respective turbine assemblies to the wind by changing the rotational position of the shroud members about the system axis. The turbine assemblies are interconnected to a generator for the production of electrical power.

What is needed, therefore, is a wind turbine that is capable of operating in variable wind conditions, including high velocity or low velocity wind. Such a wind turbine should be easy to operate, while being relatively inexpensive to build and maintain.

SUMMARY OF THE INVENTION

The present invention thus provides a turbine system and method for generating electrical power. The turbine system includes a support and a pair of wheels rotatably mounted on the support. The turbine includes at least one wind catching blade mounted to each wheel for rotating the wheel by the force of the wind. The at least one blade is structured and positioned for oppositely rotating the pair of wheels under the force of the wind. The pair of oppositely rotating wheels can engage a rotor of a generator for rotation thereof to produce electricity. The turbine includes a motor disposed about the pair of wheels and in mechanical connection with at least one wheel for imparting rotation to the pair of wheels independently of the rotation of the wheels produced by the force of the wind.

According to another embodiment of the invention, there is provided at least one blade generally shaped and dimensioned as to define a circular member, such as, for example, a wheel, capable of turning on an axle. According to one embodiment of the aspect of the invention, a plurality of blades can be shaped and dimensioned as to generally take the form of a hemisphere. For example, the invention can be constructed in the form of a sphere including two oppositely rotating hemispheres mounted on a common axis of rotation. Preferably, the blade may be made of light materials including, but not limited to, aluminum, carbon fiber, and composite materials such as, for example, carbon fibre-reinforced polymer, glass fibre-reinforced polymer with various compositions.

A further embodiment of the present invention provides for a method for generating electricity. To generate electrical power, a pair of wheels rotate oppositely on a central shaft. The rotation of the pair of wheels is produced by the force of the wind and, independently by at least one motor. A plurality of generators are driven by the rotation of the wheels for generating power. The rotation of the wheels can be adjusted at a desired speed, in function of the velocity of the wind, and via the at least one motor which is disposed about the wheels and is connected to the wheels so as to impart rotation thereof.

As an aspect of the present inventions, there is provided a wind turbine system comprising a first ring-like disk having at least one wind catching blade mounted diametrically therein, a framework for supporting the first ring-like disk in a substantially vertical position and the first ring-like disk is rotatably connected via its central axis to the framework, the framework being mounted on a platform for elevating the first ring-like disk, at least one generator having a rotor and being mounted on the framework and disposed radially on a first outer rim of the first ring-like disk and the rotor being in intimate contact with the outer rim of the first ring-like disk to transmit torque for generating electricity via a rotation of the first ring-like disk by a force of a wind, and a first motor being in mechanical connection with the first ring-like disk for rotating the first ring-like disk independently of the rotation produced by the force of the wind.

This aspect of the present invention may also further comprise a second ring-like disk having at least one wind catching blade mounted diametrically therein which are structured and positioned to rotate the second ring-like disk in an opposite direction of the first ring-like disk, the second ring-like disk is rotatably connected via its central axis to the framework and is substantially parallel to the first ring-like disk, the rotor also being in intimate contact with a second outer rim of the second ring-like disk to transmit torque for generating electricity via a rotation of the second ring-like disk by the force of the wind, and a second motor being in mechanical connection with the second ring-like disk for rotating the second ring-like disk independently of the rotation produced by the force of the wind.

As another aspect of the present invention, there is provided a wind turbine system comprising a first ring-like disk having at least one wind catching blade mounted perpendicularly on a first rim thereof, a framework for supporting the first ring-like disk in a substantially horizontal position and the first ring-like disk is rotatably connected via its central axis to the framework, the framework being mounted on a platform for elevating the first ring-like disk, at least one generator having a rotor and being mounted on the framework and disposed radially on the first outer rim of the first ring-like disk and the rotor being in intimate contact with the outer rim of the first ring-like disk to transmit torque for generating electricity via a rotation of the first ring-like disk by a force of a wind, and a first motor being in mechanical connection with the first ring-like disk for rotating the first ring-like disk independently of the rotation produced by the force of the wind.

This aspect of the present invention may also further comprise a second ring-like disk having at least one wind catching blade mounted perpendicularly on a second rim thereof which are structured and positioned to rotate the second ring-like disk in an opposite direction of the first ring-like disk, the second ring-like disk is rotatably connected via its central axis to the framework and is substantially parallel to the first ring-like disk, the rotor also being in intimate contact with a second outer rim of the second ring-like disk to transmit torque for generating electricity via a rotation of the second ring-like disk by the force of the wind, and a second motor being in mechanical connection with the second ring-like disk for rotating the second ring-like disk independently of the rotation produced by the force of the wind.

As another aspect of the present invention, there is provided a method for generating electricity comprising the steps of producing, by a force of a wind and/or independently by at least one motor, a rotation of at least one wheel having a wind catching blade on a central shaft, and rotating a rotor which is in intimate of at least one generator which driven by the rotation of the wheels.

BRIEF DESCRIPTION OF THE DRAWINGS

The invention will be further understood from the following detailed description of preferred embodiments of the invention in conjunction with the accompanying drawings, in which.

DETAILED DESCRIPTION OF THE INVENTION

Referring now in more detail to the drawings, in which like numerals refer to like parts throughout the several views, FIGS. 1 to 11 show a turbine system generally designated by reference numeral 100 according to an embodiment of the present invention. The turbine system 100 preferably may be used with a plurality of generators 10 for generating electrical power.

Figure 1:
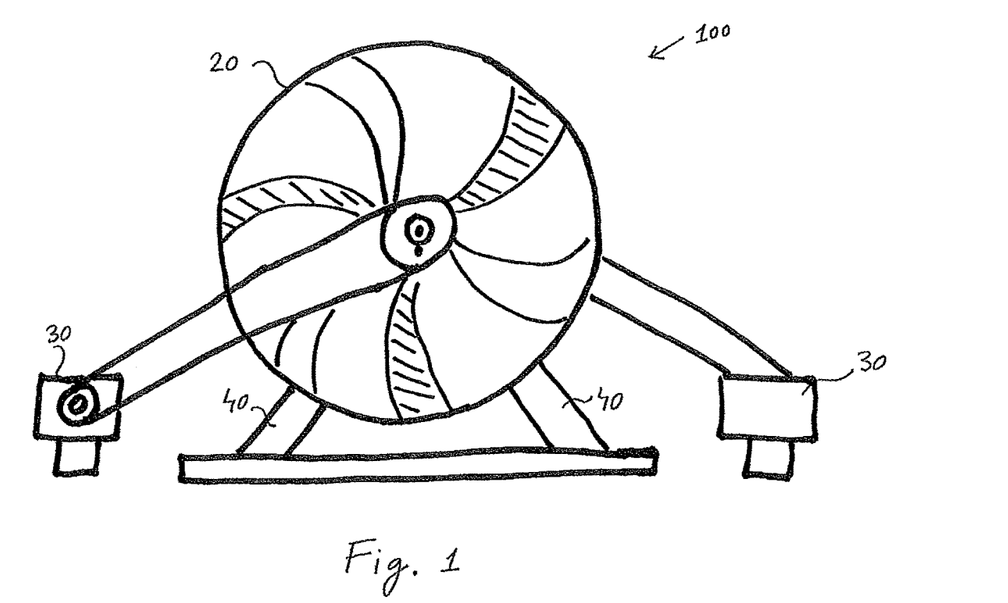
FIG. 1 is a front plan view of a turbine system according to an embodiment of the present invention.

As shown in FIG. 1 and embodied herein, the turbine system includes a pair of wheels or disks 20 adapted to rotate around an axis of rotation. The wheels or disks 20 are substantially parallel to one another. Preferably, the wheels or disks 20 can be held in place by a framework and/or can be disposed on an axle or pin for free rotation. A support 40 can be used to elevate the wheels or disks 20 above the ground. The support can be disposed on a platform 41.

Figure 2:
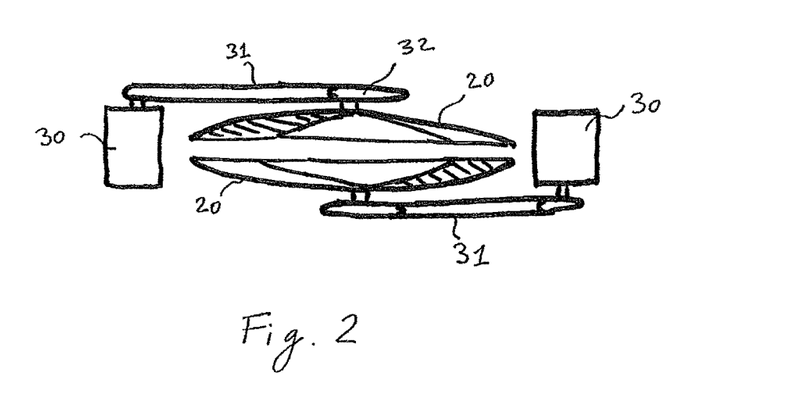
FIG. 2 is a top plan view of a turbine system according to an embodiment of the present invention.

As further shown in FIGS. 1 and 2, a motor 30 can be disposed about the wheel 20. The motor 30 can be used to rotate the wheel 20. For example, the mechanical power generated by the motor 30 can be transmitted to the wheel 20 by a chain drive. The chain drive can include a roller chain 31 and a sprocket gear 32. Other means of transmitting the mechanical power or torque from the motor 30 to the wheel 20 can be used to rotate the wheel 20. Preferably, the source of mechanical energy can be an electrical motor or an engine. For example, the engine or prime mover can include an engine driven motor fueled on gas, diesel, natural gas, steam etc. Alternative sources of power can also be used, such as, for example, solar, hydrogen, compressed air, etc.

A gear system can also be used to control the transmission of rotational speed from the motor 30 to the wheels 20. For example, a slip gear can be used so as in case of overheating of one of the motors 30 the power source can be switched to the other motor 30. In addition, for example, the slip gear can be useful in the case of differential RPM for a multistage system. A system of pulleys and belts or sprockets and chains may also be used for the transmission of mechanical power from the motor 30 to the wheel 20. For example one or more pulleys can be attached to the center of each disk or wheel 20, the pulleys being used to transmit rotational power to the wheel when the motor 30 is in operation.

Figure 3:
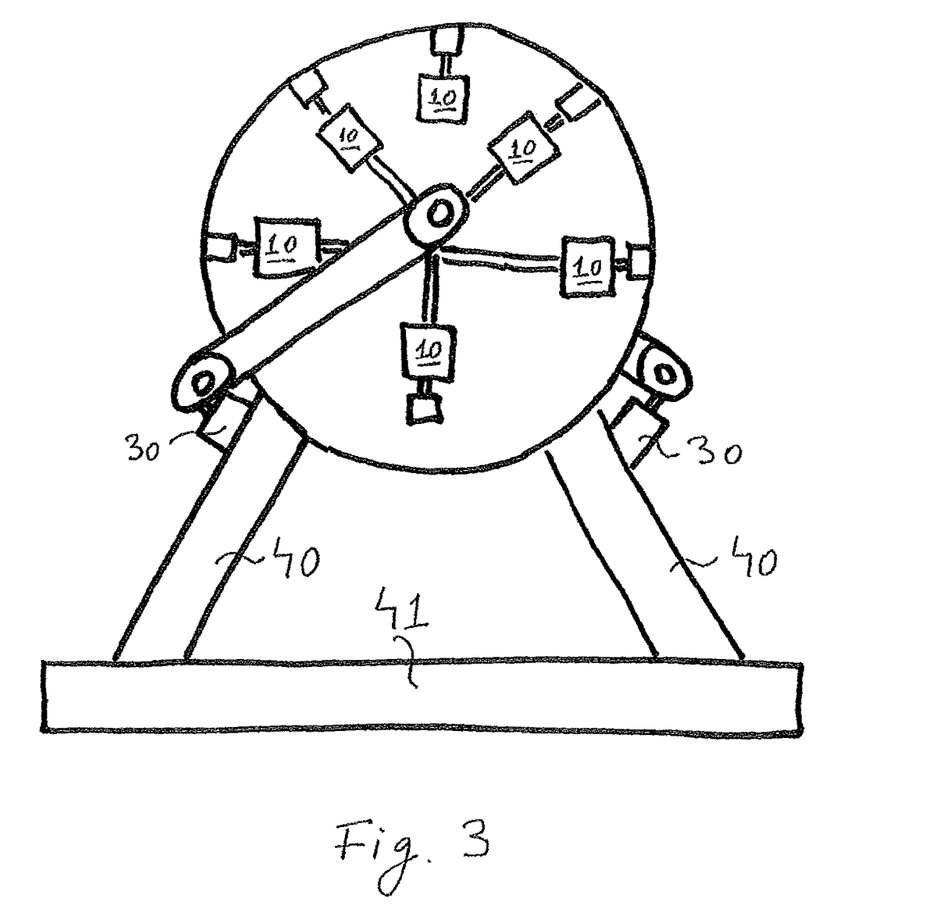
FIG. 3 shows a wheel with a plurality of generators disposed radially inside a wheel of a turbine system according to an embodiment of the present invention.
Figure 7:
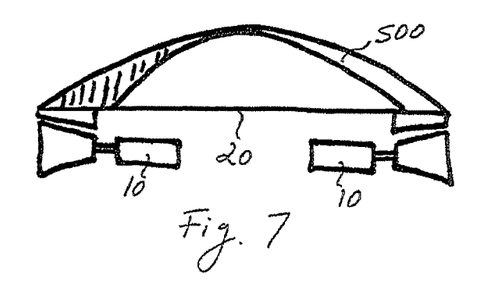
FIG. 7 shows a wheel and generator configuration for use with a turbine of the present invention according to an embodiment thereof.
Figure 8:
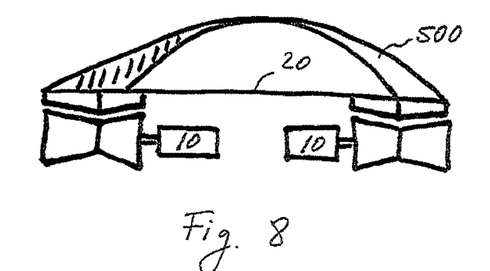
FIG. 8 shows a wheel and generator configuration for use with a turbine of the present invention according to another embodiment thereof.

As shown in FIG. 3 and embodied herein, the system according to a preferred embodiment of the invention, can generate electricity with the use of one or more electric generators 10. Any electric generator can be used with the present invention according to a desired application. The electric generator 10 can be activated by the rotation of the pair of wheels 20. In operation, the pair of wheels 20 can be rotated by the wind and/or, independently, by the motor 30. The rotation of the wheels 20 can be transmitted to an electric generator 10 for generating electricity. For example, each wheel 20 can engage the rotor of the generator for rotation thereof. By way of example only, the wheel 20 can be provided with a plurality of teeth which can mesh with a toothed part of the rotor or shaft of the electric generator 10 in order to transmit torque from the wheel 20 to the generator 10. As shown in FIGS. 7 and 8, in particular exemplary embodiments, but not limited to, the wheel 20 has a tapered rim adapted to engage a beveled or circular shape cone portion of the electric generator 10. In accordance with another embodiment the wheel 20 can frictionally engage the rotor part of the generator 10. For example, a portion of the wheel can be provided with a rubber layer or member 20 for frictionally engaging the rotor 10. The rotor can also include a rubber layer or member such as, for example, rubber projections, for maximizing the frictional engagement between the wheel and the rotor. The generators 10 may also be provided with a wheel attached to the rotor that can be frictionally engaged by the wheels 20 to turn the rotor.

Figure 12:
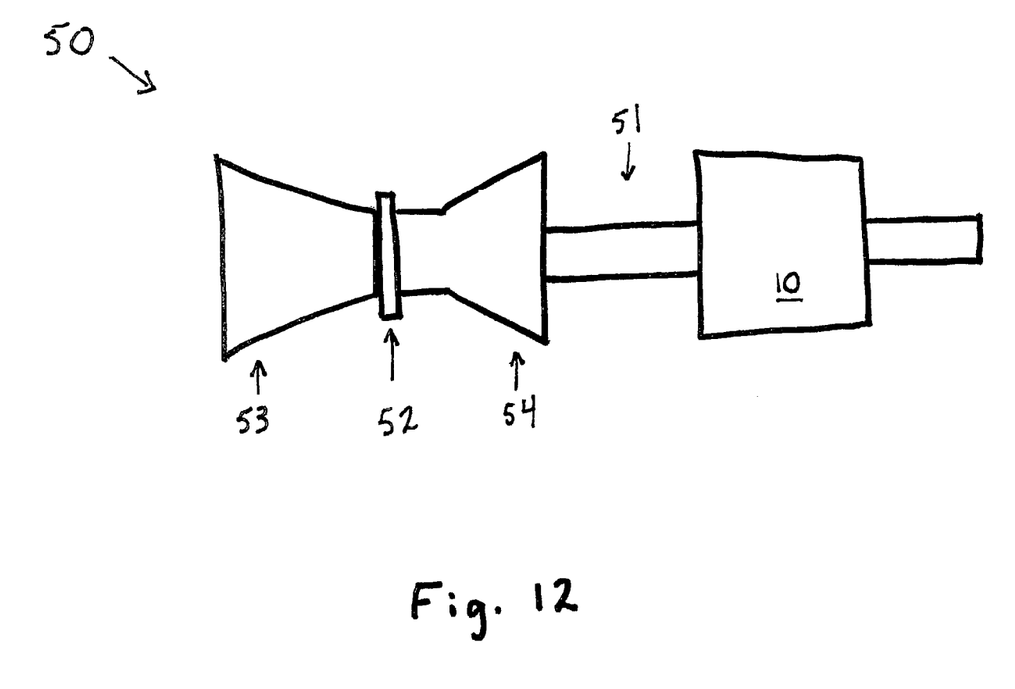
FIG. 12 shows a plan view of a harmony wheel attached to a generator according to an embodiment of the present invention.

The generator 10 may also be provided with a harmony wheel 50 attached to the rotor 51. The harmony wheel generally comprises two portions each of which may rotate independently via at least one bearing 52. An outer portion 53 of the harmony wheel rotates independently of the rotor 51 of the generator 10 and an inner portion 54 is affixed to the rotor 51 and rotates in unison with the rotor. This allows the generator to be disengaged without physically moving the wheel 20 and continues to provide support for the wheel 20.

Other examples of generators include an axial flux air gap or magneto configuration. Permanent magnets are mounted on the wheel 20 and displaced radially along the outer edge thereof. The stator coils are mounted and displaced radially on a stator disk located in proximity to the wheel 20 or in between the pair of wheels 20. Other examples include a permanent magnet synchronous generator or alternator.

All of these different types of generators may be used at the sole source of power generation, or alternatively, they may be used in conjunction with each other.

According to a preferred embodiment, the turbine system can include a brake mechanism for stopping the wheels and immobilizing the wheels as desired or necessary. The braking system can also be used for braking the rotor in case of emergency, e.g. when a failure of the drive system occurs, or when the turbine is in an uncontrolled condition. For example, a system including a brake inside the sprocket or pulley can be attached directly to the wheels' axle for placing the wheels in a state of rest and for securing the wheels in such position. According to another exemplary embodiment, a brake system includes a flat disk adapted to be pressed against the periphery of the wheels 20 for frictionally reducing the rotation of the wheels or immobilizing the wheels in a stopped position. Additional means for securing the wheels in a state of rest can be provided as known to a man skilled in the art.

Figure 4:
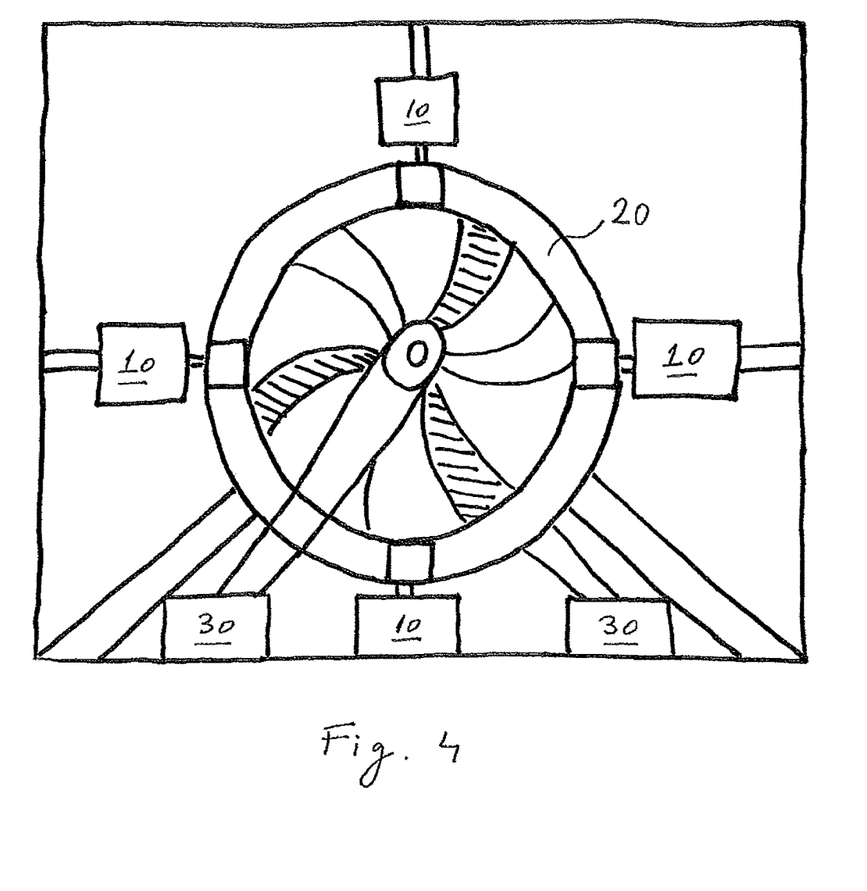
FIG. 4 shows a wheel of a turbine system with a plurality of generators disposed radially outside the wheel according to an embodiment of the present invention.
Figure 6:
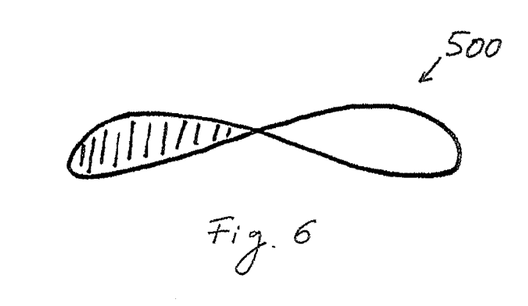
FIG. 6 shows a wind blade for use with a turbine system according to an embodiment of the present invention.

As shown in FIG. 4 and embodied herein, the two disks include wind catching blades 500 of various configurations. An exemplary blade for use with the turbine system of the present invention is shown in FIG. 6. Other shapes and forms can be used as known to a man skilled in the art. For example, the invention can be implemented as a pair of wheels 20 or disks rotatably mounted on a common axle. The wheels 20 rotate in opposite directions, one wheel 20 can rotate clockwise, while the other wheel 20 can rotate counterclockwise. When the wind is low or absent the rotation of the wheels can be maintained by a motor 30 disposed about the wheels. Preferably, a motor 30 is provided for each wheel 20. For example, the motor or motors 30 can be used to adjust the rotational speed of the wheels when the wind is low in order to maintain a constant electric output from the generators. Preferably, the wheels 20 are mounted on a support 40, which can be an elevated support so as to maximize the wind force over the blades 500.

Figure 11:
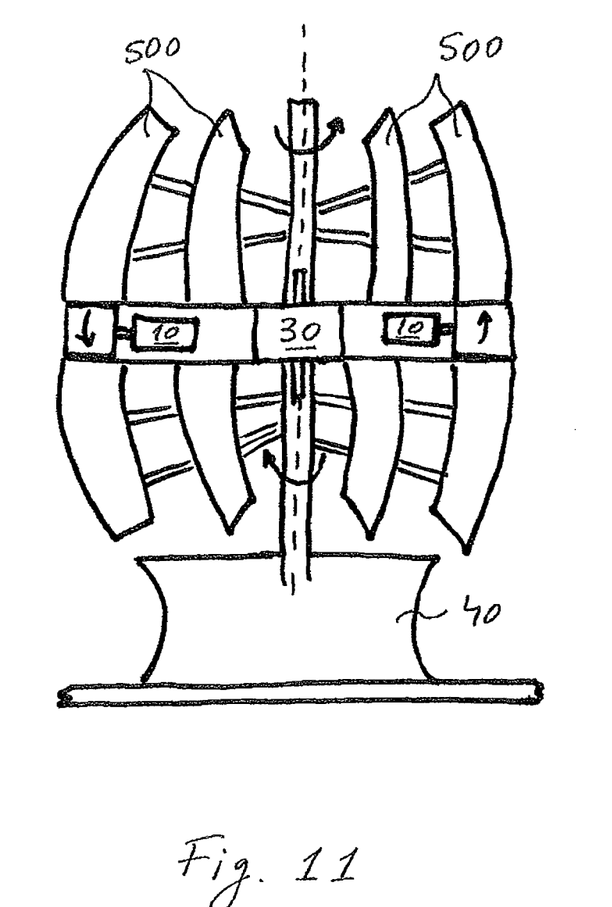
FIG. 11 shows a turbine system having a horizontal configuration according to an embodiment of the present invention.

As shown in FIG. 11, the invention can be also implemented in the form of a sphere with the two wheels or disks 20 generally shaped as hemispheres. Thus, the structure of the wind turbine can be divided into two oppositely rotating hemispheres mounted on a common axle. Each hemisphere can include a plurality of blades 500 centered in the centered of the hemisphere. The blades 500 can be curved so as to generally define a hemisphere. In a similar way, one or more motors 30 can be used to adjust the rotational speed of the hemispheres when the wind is low in order to maintain a constant electric output from the generators. The wheels 20 can be disposed such as their axis of rotation is vertical or horizontal. The turbine system can be build using light materials for the wheels and blades. The light materials can include for example, aluminum, carbon fibre, and composite materials such as for example carbon fibre-reinforced polymer, glass fibre-reinforced polymer with various compositions. Other materials can also be used, such as for example, steel, wood, etc. in various compositions according to desired requirements and applications.

Advantageously, the turbine system of the present invention can function as a multistage system. For example, a wind speed sensing assembly or wind speed sensor can be used for determining the speed of the wind. The wind speed sensing assembly can operate the motors at variable speeds so as to keep the power generation constant or at a desired predetermined level. A Programmable Logic Controller (PLC) can be used to control the rotational speed of the motors, which in turn rotate the wheels, having regard to the speed of the wind. The PLC can also be coupled with the braking system and mechanism so as to start, halt or slow down the wheels as desired and/or according to a predetermined schedule. For example, in low wind the motors can be used to maintain the rotation of the wheels at a desired speed so as to generate a predetermined amount of electric power. When the wind speed is high, the motors can be automatically disengaged or disconnected. A plurality of sensors can be provided such as, for example, sensors to determine the rotational speed of the wheel, the force of the wind, electrical power generated, power consumption, etc. Other electronic components may include timers and electronic switches, as well as safety sensors, which can be coupled and connected to the PLC for efficient control of the turbine system.

Figure 5:
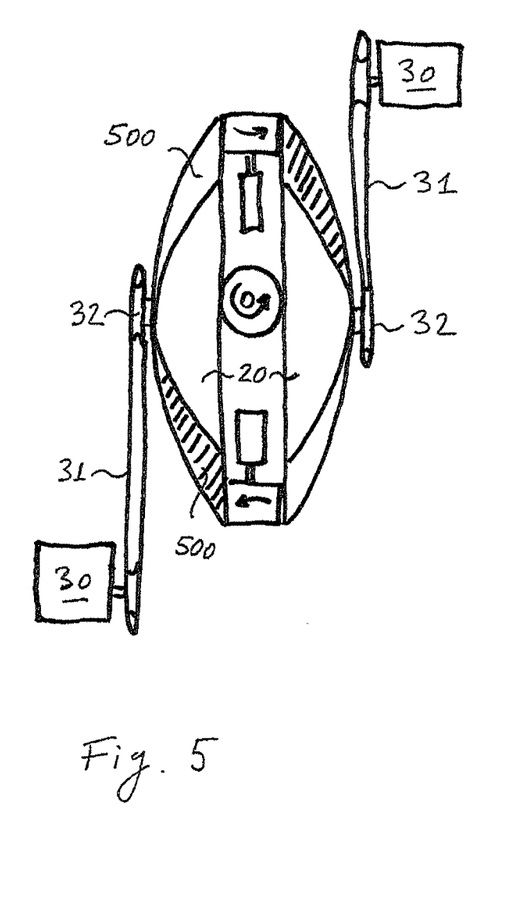
FIG. 5 is a top plan view of a turbine system according to an embodiment of the invention with generator disposed radially inside the wheels.

As shown in FIG. 5 and embodied herein, one or more generators 10 can be disposed about the wheels for transferring the torque generated by rotation of the wheels to the generators 10 for producing electric power. Exemplary configurations, but not limited to, are illustrated in FIGS. 3 and 4. For example a plurality of generators 10 can be disposed radially on the inside or outside portions defined by the wheels 20. Each generator 10 can be independently engaged or disengaged from the wheels 20. This can be controlled automatically by the PLC and can be operated according to certain parameters. For example, the supply of electricity can be adjusted to the specific time of the day or the peek demand by connecting or disconnecting one or more generators from the wheels.

Figure 9:
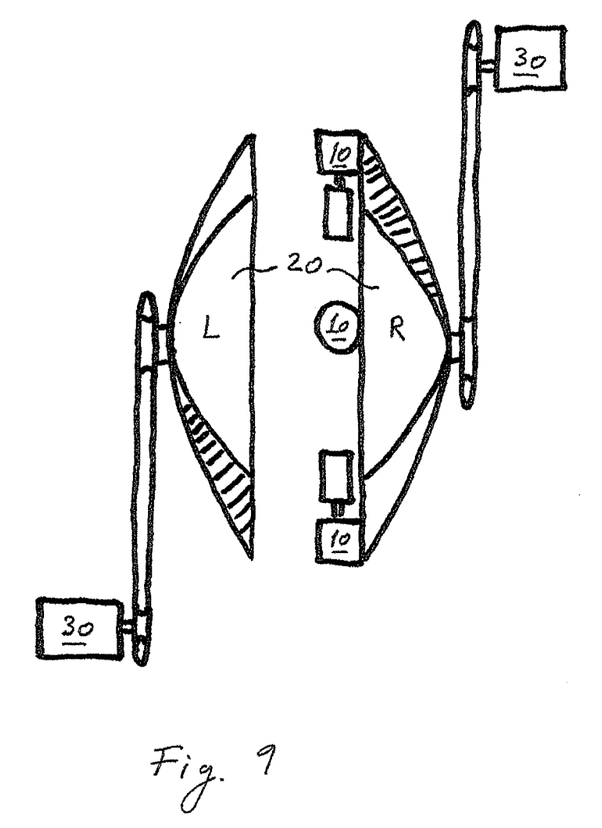
FIG. 9 is a plan view of a turbine system with wind blades and generators in which the left wheel is disengaged according to an embodiment of the present invention.
Figure 10:
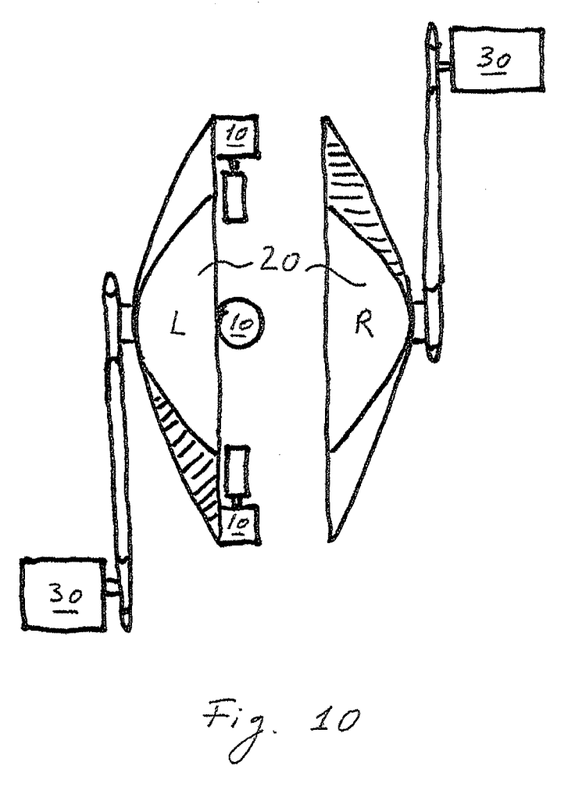
FIG. 10 is a plan view of a turbine system with wind blades and generators in which the right wheel is disengaged according to an embodiment of the present invention.

Also in an advantageous manner, as shown in FIGS. 9 and 10, the turbine system can be provided with a means for moving each of the wheels 20 independently from one another in and out of operational contact with the generators 10. For example, each wheel can be mounted on a roller-mounted carriage slidable on tracks or similar moving means so that the wheel can be moved out of contact with the rotor of the generators 10. This can be used to, for example, place one or both wheels in an idle position by moving the wheels 20 out of the plane in which the wheels can operate the generators 10. Also, this can be used to access the internal confines of the system for maintenance or otherwise.

As a further modification to all of the previously described embodiments, any of the motors 30 may be replaced by generators 10, and conversely any of the generators 10 may be replaced by motors 30.

Preferably, a backup battery system or a DC load can be connected to the power output of the turbine. For example, a battery storage system that is separate to the turbine system can be connected to the turbine as a backup in the event of loss output from the turbine. The battery or other power storage device is connected to the turbine system for backup power and also, for example, to allow maintenance of the system without interruption of the power supply. The backup battery system may also be operated to be continuously charged by the generators 10 while the backup battery system supplies power to a load.

INDUSTRIAL APPLICABILITY

The present invention is applicable to the technical field of generating electricity by wind power.

LIST OF REFERENCE NUMERALS

| 100 | wind turbine system | 41 | platform |
| 10 | generator | 50 | harmony wheel |
| 20 | wheel | 51 | rotor |
| 30 | motor | 52 | bearing |
| 31 | chain | 53 | outer portion |
| 32 | pulley | 54 | inner portion |
| 40 | support | 500 | blade |

What is claimed:

1. A wind turbine system comprising:
   a first open-disc having at least one wind catching blade mounted diametrically therein;
   a second open-disc having at least one wind catching blade mounted diametrically therein which are structured and positioned to rotate the second open-disc in an opposite direction of the first open-disc;
   a framework for supporting the first open-disc in a substantially vertical position and the first open-disc is rotatably connected via a central axis of the first open-disc to the framework, the framework being mounted on a platform for elevating the first open-disc, and the second open-disc is rotatably connected via a central axis of the second open-disc to the framework and is substantially parallel to the first open-disc, the central axis of the first open-disc and the second open-disc being a same central axis;
   a plurality of generators, each having a rotor individually coupled to the first open-disc and the second open-disc, and being mounted on the framework and disposed radially along the first open-disc and second open-disc, respectively, and extending to a first outer rim of the first open-disc and to a second outer rim of the second open-disc, respectively, the rotors of each of the plurality of generators being in intimate contact with the first outer rim of the first open-disc to transmit torque for generating electricity via a rotation of the first open-disc by a force of a wind and the rotors of each of the plurality of generators also being in intimate contact with the second outer rim of the second open-disc to transmit torque for generating electricity via a rotation of the second open-disc by the force of the wind, the rotor of each of the plurality of generators being in between the first outer rim of the first open-disc and the second outer rim of the second open-disc;
   a first motor being in mechanical connection with the first open-disc for rotating the first open-disc independently of the rotation produced by the force of the wind; and
   a second motor being in mechanical connection with the second open-disc for rotating the second open-disc independently of the rotation produced by the force of the wind.

2. The wind turbine system according to claim 1, wherein the mechanical connection is a chain and sprocket gearing system.

3. The wind turbine system according to claim 1, wherein the mechanical connection is a pulleys and belts system.

4. The wind turbine system according to claim 1, wherein the first and second motors control a rotational speed (revolution per minute) of the first and second opendiscs, respectively, via a programmable logic controller.

5. The wind turbine system according to claim 1, wherein the intimate contact between each of the rotors of the plurality of generators and the first and second outer rims is provided by a taper on the first and second outer rims which is adapted to engage a beveled or circular shaped cone portion of the rotor.

6. The wind turbine system according to claim 1, wherein each of the rotors of the plurality of generators and the first and second outer rims is provided with a rubber layer or member to increase a friction of the intimate contact.

7. The wind turbine system according to claim 1, further comprising a braking mechanism for stopping or slowing the first and second open-discs from rotating.

8. The wind turbine system according to claim 1, wherein the first and second open-discs are independently disengageable from each of the rotors of the plurality of generators via a first sliding mechanism and a second sliding mechanism, respectively.

9. The wind turbine system according to claim 8, wherein the plurality of generators are independently disengageable from the first and second open-discs via the first sliding mechanism and the second sliding mechanism, respectively.

10. The wind turbine system according to claim 1, further comprising a wind speed sensing assembly for determining a speed of the wind and an output power that is produced by the wind turbine system.

11. The wind turbine system according to claim 10, wherein the wind speed sensing assembly further comprises a programmable logic controller for controlling the output power of the wind turbine system.

12. The wind turbine system according to claim 11, wherein the programmable logic controller maintains the output power at a predetermined level.

13. The wind turbine system according to claim 12, further comprising a backup battery system for storing the output power and/or providing the output power to a load.

14. A wind turbine system comprising:
a first open-disc having at least one wind catching blade mounted perpendicularly to a first rim thereof, said first open-disc and at least one wind catching blade together shaped as a hemisphere;
a second open-disc having at least one wind catching blade mounted perpendicularly to a second rim thereof, said second open-disc and at least one wind catching blade together shaped as a hemisphere, which are structured and positioned to rotate the second open-disc in an opposite direction of the first open-disc;
a framework for supporting the first open-disc in a substantially horizontal position and the first open-disc is rotatably connected via a central axis of the first open-disc to the framework, the framework being mounted on a platform for elevating the first open-disc, and the second open-disc is rotatably connected via its central axis of the second open-disc to the framework and is substantially parallel to the first open-disc, the central axis of the first open-disc and the central axis of the second open-disc being a same central axis;
a plurality of generators individually coupled to the first open-disc and the second open-disc, each generator having a rotor and being mounted on the framework and disposed radially on a first inner rim of the first open-disc and on a second inner rim of the second open-disc, the rotor of each of the plurality of generators being in intimate contact with the first inner rim of the first open-disc to transmit torque for generating electricity via a rotation of the first open-disc by a force of a wind and the rotors of each of the plurality of generators also being in intimate contact with the second inner rim of the second open-disc to transmit torque for generating electricity via a rotation of the second open-disc by the force of the wind, the rotors of each of the plurality of generators being in between the first inner rim of the first open-disc and the second inner rim of the second open-disc;
a first motor being in mechanical connection with the first open-disc for rotating the first open-disc independently of the rotation produced by the force of the wind; and
a second motor being in mechanical connection with the second open-disc for rotating the second open-disc independently of the rotation produced by the force of the wind.

15. The wind turbine system according to claim 14, wherein the mechanical connection is a chain and sprocket gearing system.

16. The wind turbine system according to claim 14, wherein the mechanical connection is a pulleys and belts system.

17. The wind turbine system according to claim 14, wherein the first and second motors control a rotational speed (revolution per minute) of the first and second open-discs, respectively, via a programmable logic controller.

18. The wind turbine system according to claim 14, wherein the intimate contact between each of the rotors of the plurality of generators and the first and second inner rims is provided by a taper on the first and second inner rims which is adapted to engage a beveled or circular shaped cone portion of the rotor.

19. The wind turbine system according to claim 14, wherein each of the rotors of the plurality of generators and the first and second inner rims is provided with a rubber layer or member to increase a friction of the intimate contact.

20. The wind turbine system according to claim 14 further comprising a braking mechanism for stopping or slowing the first and second open-discs from rotating.

21. The wind turbine system according to claim 14, wherein the first and second open-discs are independently disengageable from each of the rotors of the plurality of generators via a first sliding mechanism and a second sliding mechanism, respectively.

22. The wind turbine system according to claim 21, wherein the plurality of generators are independently disengageable from the first and second open-discs via the first sliding mechanism and the second sliding mechanism, respectively.

23. The wind turbine system according to claim 14 further comprising a wind speed sensing assembly for determining a speed of the wind and an output power that is produced by the wind turbine system.

24. The wind turbine system according to claim 23, wherein the wind speed sensing assembly further comprises a programmable logic controller for controlling the output power of the wind turbine system.

25. The wind turbine system according to claim 24, wherein the programmable logic controller maintains the output power at a predetermined level.

26. The wind turbine system according to claim 25 further comprising a backup battery system for storing the output power and/or providing the output power to a load.

27. A wind turbine system comprising:
a first open-disc having at least one wind catching blade mounted diametrically therein;
a second open-disc having at least one wind catching blade mounted diametrically therein which are structured and positioned to rotate the second open-disc in an opposite direction of the first open-disc;

a framework for supporting the first open-disc in a substantially vertical position and the first open-disc is rotatably connected via a central axis of the first open-disc to the framework, the framework being mounted on a platform for elevating the first open-disc, and the second open-disc is rotatably connected via a central axis of the second open-disc to the framework and is substantially parallel to the first open-disc, the central axis of the first open-disc and the second open-disc being a same central axis;

a plurality of generators, each having a rotor individually coupled to the first open-disc and the second open-disc, and being mounted on the framework and disposed around the first open-disc and second-open-disc along the outer circumference of said first open-disc and second open-disc, the rotors of each of the plurality of generators being in intimate contact with the first outer rim of the first open-disc to transmit torque for generating electricity via a rotation of the first open-disc by a force of a wind and the rotors of each of the plurality of generators also being in intimate contact with the second outer rim of the second open-disc to transmit torque for generating electricity via a rotation of the second open-disc by the force of the wind, the rotor of each of the plurality of generators being in between the first outer rim of the first open-disc and the second outer rim of the second open-disc;

a first motor being in mechanical connection with the first open-disc for rotating the first open-disc independently of the rotation produced by the force of the wind; and a second motor being in mechanical connection with the second open-disc for rotating the second open-disc independently of the rotation produced by the force of the wind.

* * * * *